(12) United States Patent
Schröter et al.

(10) Patent No.: US 6,634,250 B2
(45) Date of Patent: Oct. 21, 2003

(54) STEERING COLUMN DAMPER

(75) Inventors: Frank Schröter, Moosburg (DE); Edgar Prottengeier, Nuremberg (DE); Wolfgang Nagl, Allersberg (DE); Jens Scharf, Tuchenbach (DE); Jörg Hauhoff, Ludwigsburg (DE); Lothar Meyle, Bietingheim-Bissingen (DE)

(73) Assignees: Suspa Holding GmbH, Altdorf (DE); Bayerische Motoren Werke Aktiengesellschaft, Munich (DE); Willi Elbe Gelenkwellen GmbH & Co. KG, Tamm (DE)

( * ) Notice: Subject to any disclaimer, the term of this patent is extended or adjusted under 35 U.S.C. 154(b) by 0 days.

(21) Appl. No.: 10/041,487

(22) Filed: Jan. 10, 2002

(65) Prior Publication Data

US 2002/0088296 A1 Jul. 11, 2002

(30) Foreign Application Priority Data

Jan. 10, 2001 (DE) .......................... 101 00 726

(51) Int. Cl.$^7$ .............................. B62D 1/18; B62D 1/19; F16F 7/12; F16F 9/16; F16F 9/30
(52) U.S. Cl. ......................... 74/492; 188/371; 188/286; 188/268; 267/139
(58) Field of Search ................................ 280/777, 782, 280/784; 188/286, 268, 371–377, 312, 297; 74/492; 293/133; 267/139

(56) References Cited

U.S. PATENT DOCUMENTS

| 3,053,526 A | | 9/1962 | Kendall | |
|---|---|---|---|---|
| 3,713,641 A | | 1/1973 | Kendall | |
| 3,744,338 A | * | 7/1973 | Komatsu et al. | 74/492 |
| 3,949,623 A | * | 4/1976 | Fujiwara et al. | 74/492 |
| 4,019,403 A | * | 4/1977 | Kondo et al. | 74/492 |
| 4,255,986 A | * | 3/1981 | Mukoyama | 188/371 |
| 5,538,117 A | * | 7/1996 | Bouchez | 188/371 |
| 5,871,109 A | * | 2/1999 | Litten | |
| 6,152,488 A | * | 11/2000 | Hedderly et al. | 280/777 |
| 6,467,836 B1 | * | 10/2002 | Miller et al. | 280/777 |
| 2002/0088296 A1 | * | 7/2002 | Schroter et al. | 74/492 |

FOREIGN PATENT DOCUMENTS

| DE | 2 409 208 | | 9/1974 |
|---|---|---|---|
| DE | 21 49 759 C3 | | 5/1983 |
| DE | 37 39 781 A1 | | 6/1989 |
| DE | 40 38 010 A1 | | 6/1992 |
| DE | 19959106 | * | 9/2000 |
| DE | 199 59 107 A1 | | 9/2000 |
| DE | 19942167 | * | 3/2001 |
| DE | 10002148 | * | 7/2001 |
| DE | 10100726 | * | 7/2002 |
| EP | 1223363 | * | 11/2001 |
| FR | 2705635 | * | 12/1994 |

* cited by examiner

Primary Examiner—Douglas C. Butler
(74) Attorney, Agent, or Firm—Browdy and Neimark, P.L.L.C.

(57) ABSTRACT

A steering column damper for a power-driven vehicle comprises a jacket tube with a central longitudinal axis; a sliding tube displaceably guided in the jacket tube; a steering shaft, which is mounted for pivotability about the central longitudinal axis relative to the sliding tube and/or the jacket tube and guided through the jacket tube and the sliding tube; at least one working area, which is disposed between the jacket tube and the sliding tube and filled with a damping medium; at least one working-area-volume reduction unit, which is connected with the sliding tube, reducing the volume of the at least one working area upon insertion of the sliding tube into the jacket tube; at least one aperture which opens the at least one working area to ambience for discharge of the damping medium from the respective working area; a closing element for blocking the at least one aperture; and a triggering unit for controllable release of the respective closing element.

10 Claims, 7 Drawing Sheets

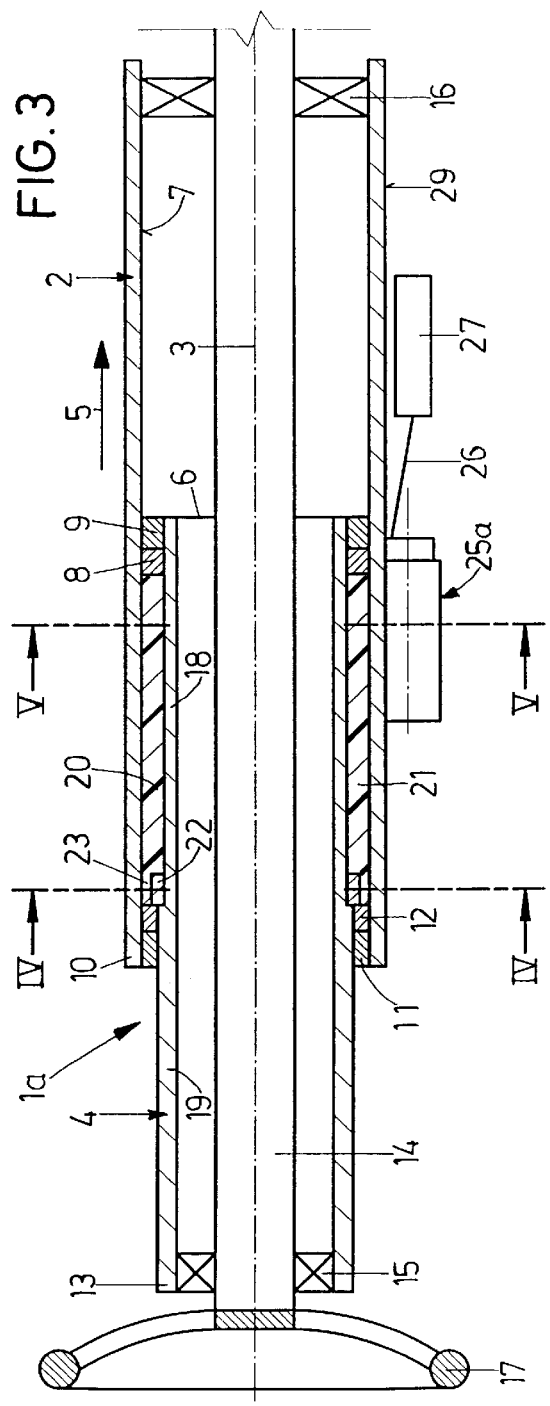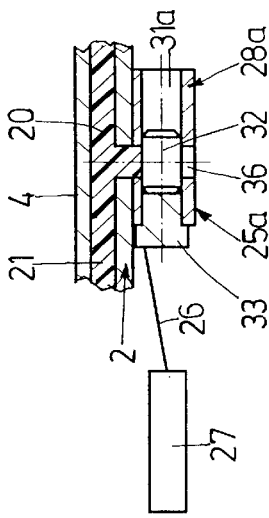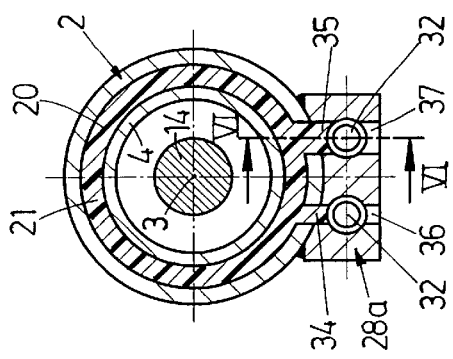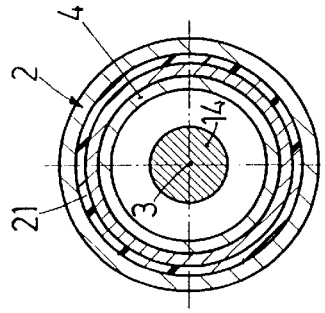

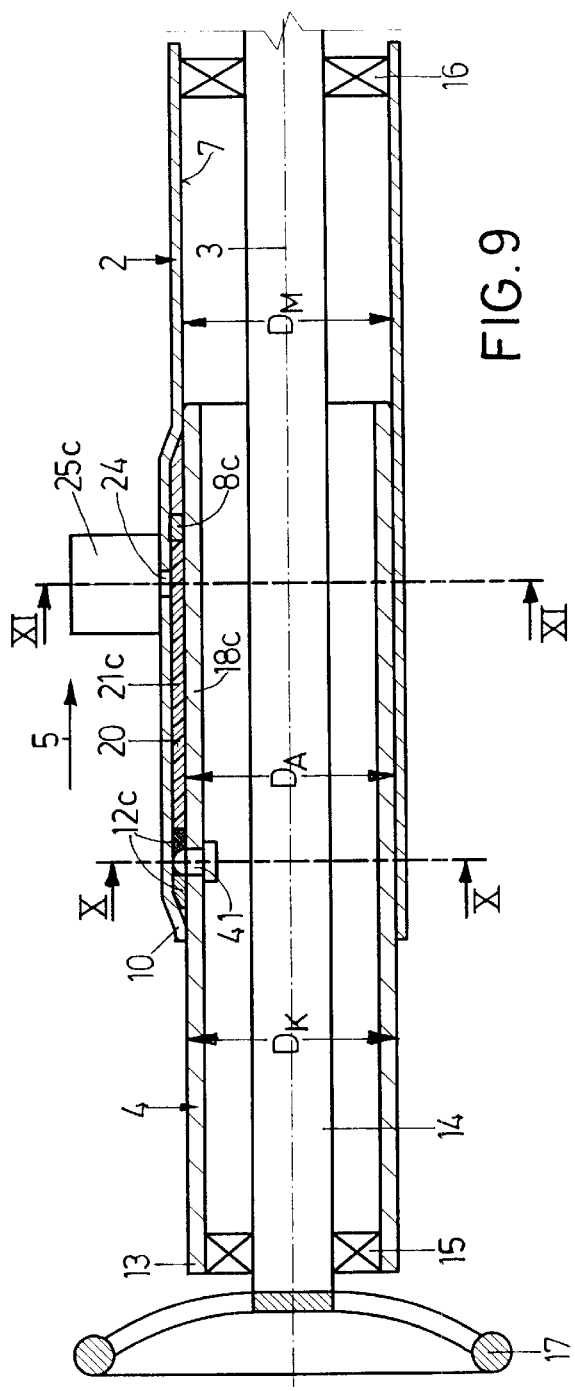
FIG. 9
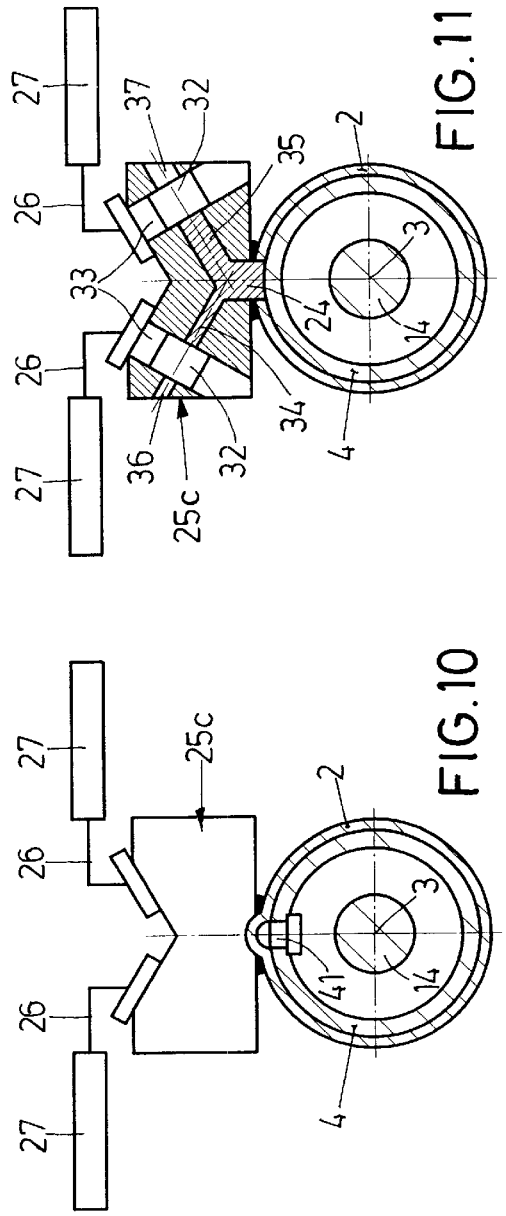
FIG. 11
FIG. 10

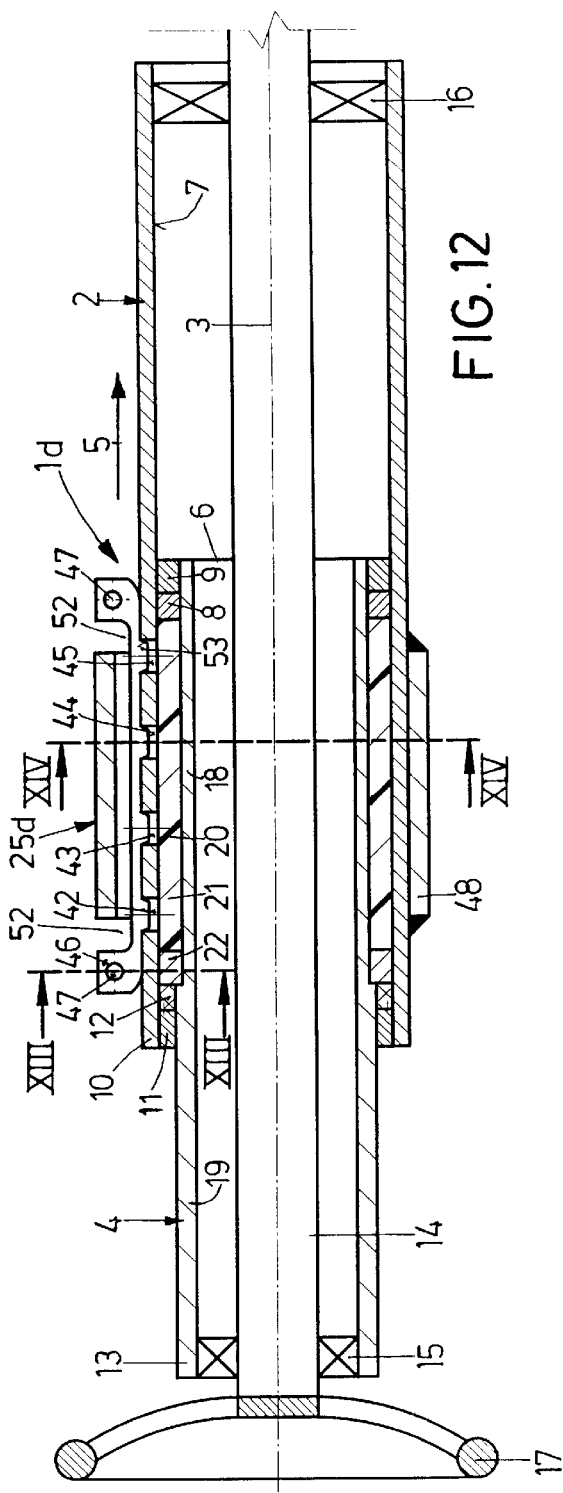
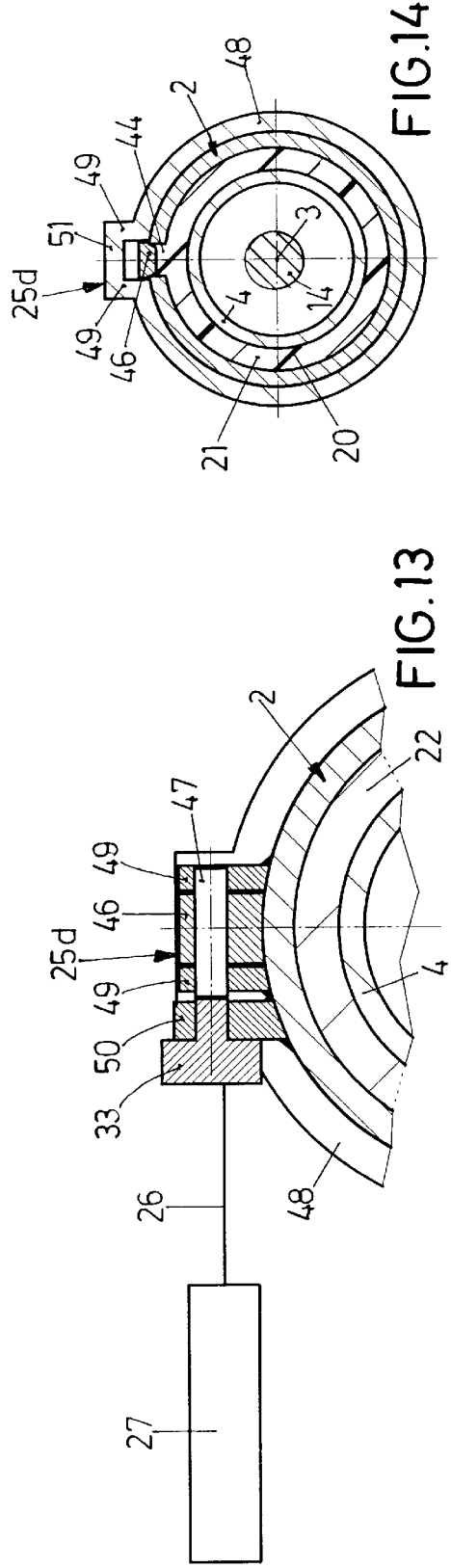

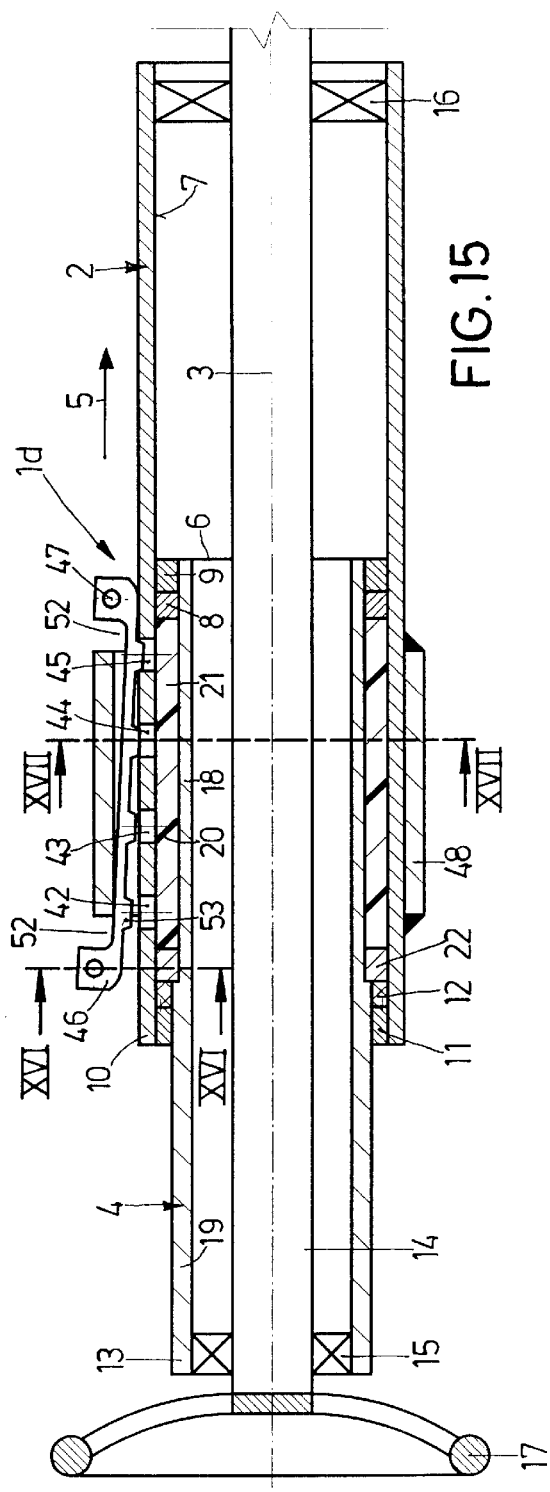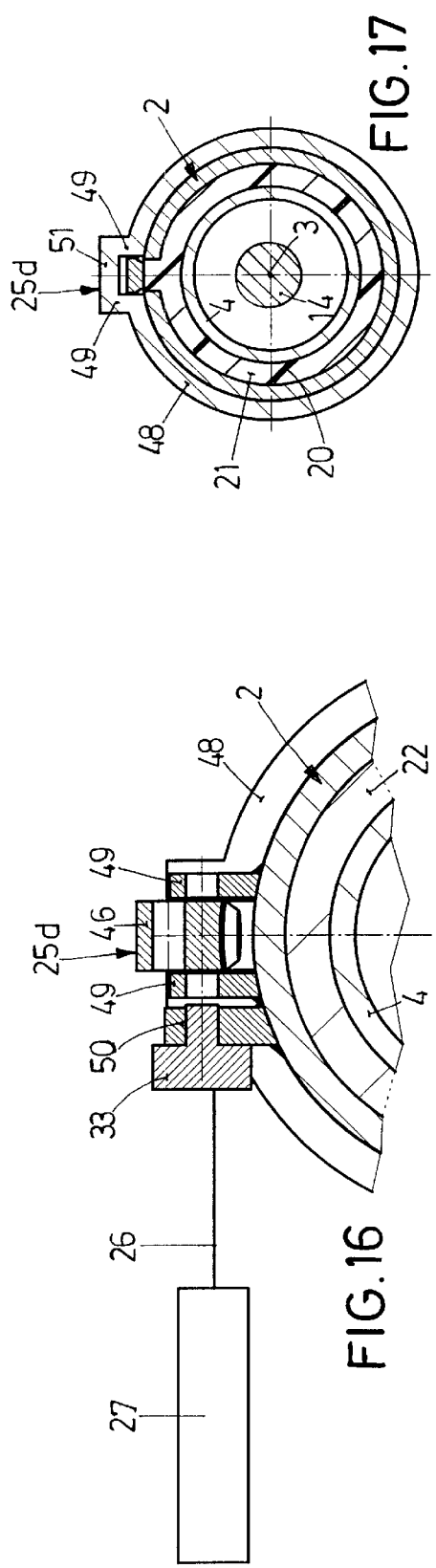

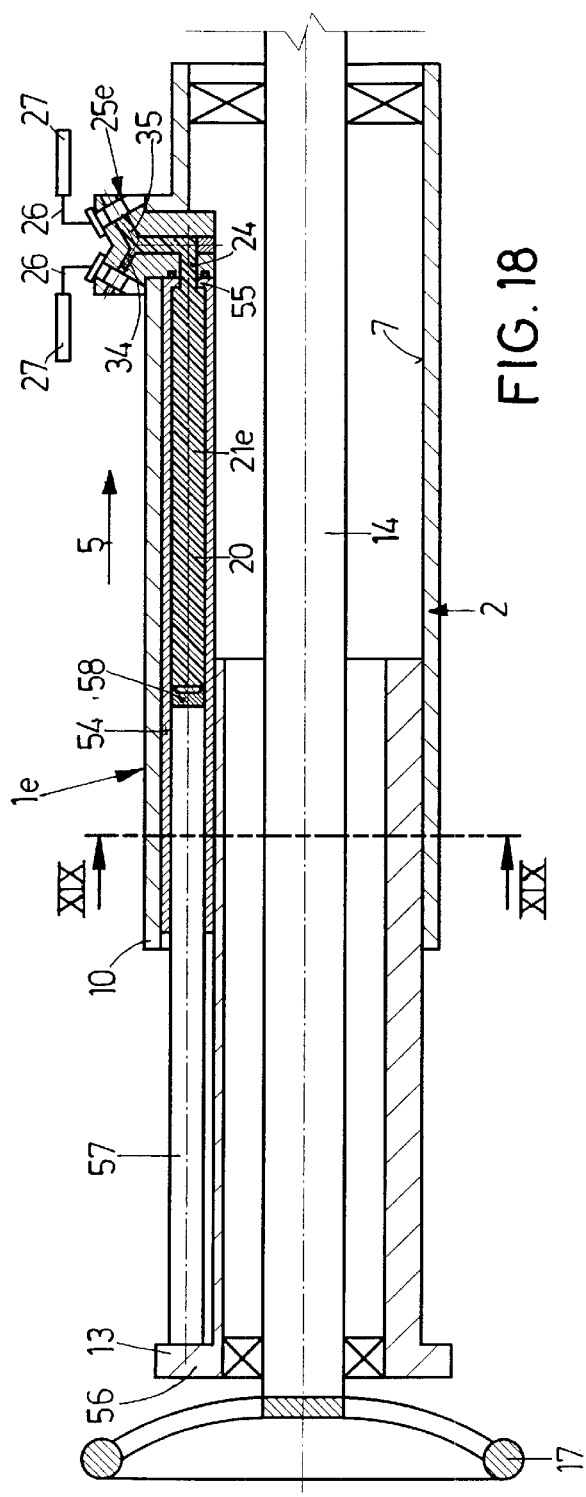
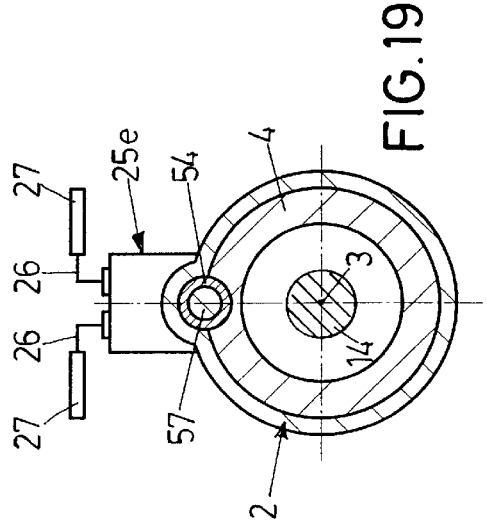
FIG. 18
FIG. 19

STEERING COLUMN DAMPER

BACKGROUND OF THE INVENTION

1. Field of the Invention

The invention relates to a steering column damper for power-driven vehicles.

2. Background Art

DE 199 59 107 A1 teaches numerous dampers for vehicle steering columns. These columns have a tubular housing which is filled with a damping medium and into which, upon impact, a piston is retractable by varying force/length characteristics. The dampers are triggered by an electronic triggering unit. They must be arranged beside the steering column.

SUMMARY OF THE INVENTION

It is an object of the invention to embody as compact as possible a steering column damper.

This object is attained in a steering column damper for a power-driven vehicle, comprising a jacket tube with a central longitudinal axis; a sliding tube displaceably guided in the jacket tube; a steering shaft, which is mounted for pivotability about the central longitudinal axis relative to the sliding tube and/or the jacket tube and guided through the jacket tube and the sliding tube; at least one working area, which is disposed between the jacket tube and the sliding tube and filled with a damping medium; at least one working-area-volume reduction unit, which is connected with the sliding tube, reducing the volume of the at least one working area upon insertion of the sliding tube into the jacket tube; at least one aperture which opens the at least one working area to ambience for discharge of the damping medium from the respective working area; a closing element for blocking the at least one aperture; and a triggering unit for controllable release of the respective closing element. The gist of the invention resides in that a damping unit is provided directly in the vicinity of the jacket tube and of the sliding tube that can be pushed therein, with the steering shaft being guided through both tubes.

Additional features and details of the invention will become apparent from the ensuing description of six exemplary embodiments, taken in conjunction with the drawings.

BRIEF DESCRIPTION OF THE DRAWINGS

FIG. 3 is a longitudinal section through a steering column damper of a second embodiment;

FIG. 4 is s cross-sectional view on the line IV—IV of FIG. 3;

FIG. 5 is a cross-sectional view on the line V—V of FIG. 3;

FIG. 6 is a longitudinal section through the closing element of FIG. 3;

FIG. 9 is a longitudinal section through a steering column damper of a fourth embodiment;

FIG. 10 is a cross-sectional view on the line X—X of FIG. 9;

FIG. 11 is a cross-sectional view on the line XI—XI of FIG. 9;

FIG. 12 is a longitudinal section through a steering column damper of a fifth embodiment in an initial position;

FIG. 13 is a cross sectional view on the line XIII—XIII of FIG. 12;

FIG. 14 is a cross sectional view on the line XIV—XIV of FIG. 12;

FIG. 15 is a longitudinal sectional view of the steering column damper of FIG. 12 in a position of triggering;

FIG. 16 is a cross sectional view on the line XVI—XVI of FIG. 15;

FIG. 17 is a cross sectional view on the line XVII—XVII of FIG. 15;

FIG. 18 is a longitudinal sectional view of a steering column damper of a six embodiment; and FIG. 19 is a cross sectional view on the line XIX—XIX of FIG. 18.

DESCRIPTION OF PREFERRED EMBODIMENTS

Figure 1:
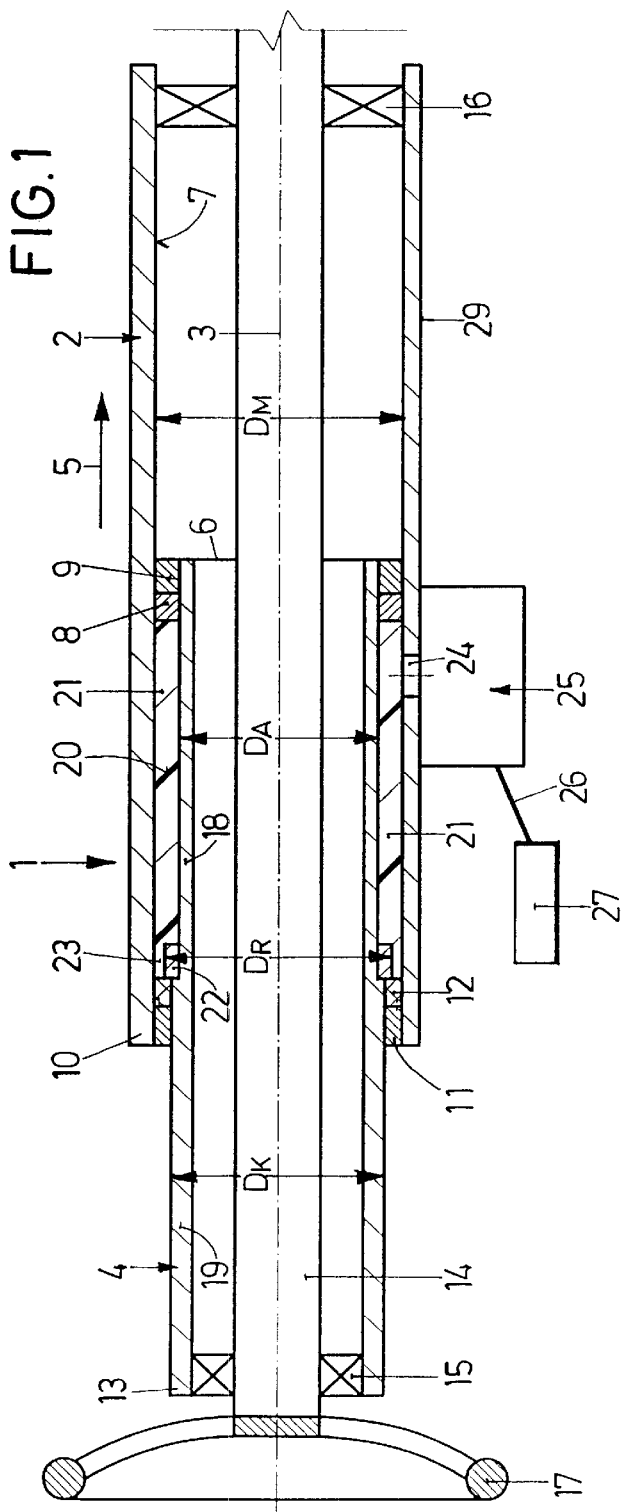
FIG. 1 is a longitudinal section through a steering column damper of a first embodiment with a closing element.
Figure 2:
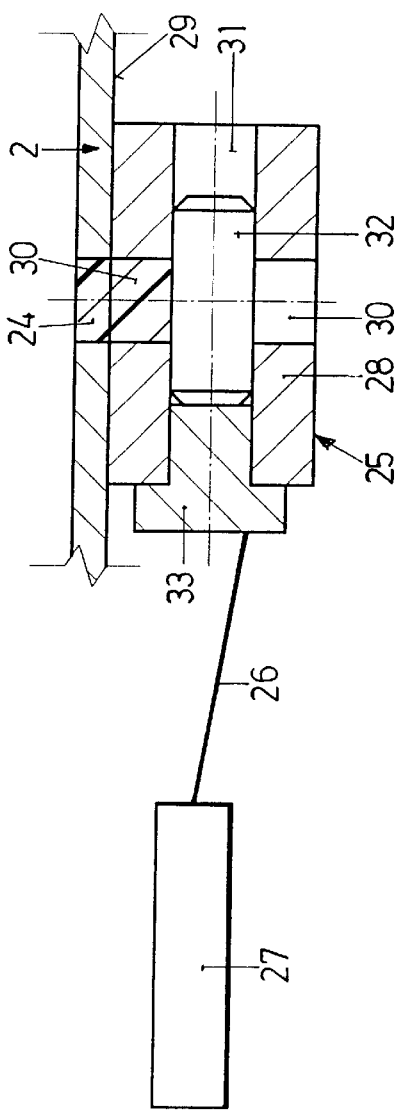
FIG. 2 is a longitudinal section through the closing element of FIG. 1.

The following is a description of a first embodiment of the invention, taken in conjunction with FIGS. 1 and 2. A steering column damper 1 for a power-driven vehicle includes an annular cylindrical jacket tube 2 which is fixed or fixable to the body of the vehicle and has a central longitudinal axis 3. In the jacket tube 2, a sliding tube 4, which is concentric of the central longitudinal axis 3, is guided for displacement and retractable into the jacket tube 2 in a push-in direction 5 which is parallel to the central longitudinal axis 3. To this end, a sealing ring 8 is secured to the end 6, located in the push-in direction 5, of the sliding tube 4, bearing sealingly on the inside wall 7 of the jacket tube 2; downstream thereof in the direction 5, a guide ring 9 is secured to the end 6 and joined to the sliding tube 4. Disposed on the end 10, located counter to the direction 5, of the jacket tube 2 are a guide ring 11 which is joined to the jacket tube 11 and, downstream in the direction 5, a sealing ring 12, both of which bear against the sliding tube 4. In the initial position seen in FIG. 1, the free end 13 of the sliding tube 4 is outside the jacket tube 2. A steering shaft 14 is disposed to pass through the sliding tube 4 and the jacket tube 2; it is concentric of the central longitudinal axis 3 and run on bearings 15 and 16 for pivoting relative to the sliding tube 4 and the jacket tube 2. By its end (not shown) that is oriented in the direction 5, the steering shaft 14 is connected to the wheels, to be steered, of the vehicle. A steering wheel 17 is mounted on the end of the steering shaft 14 that is oriented counter to the direction 5. The sliding tube 4 comprises a working area section 18 of an outside diameter $D_A$, which extends from the sealing ring 12 in the direction 5 in the initial position seen in FIG. 1. Counter to the direction 5, this section 18 is followed by an equally annular cylindrical piston section 19 of an outside diameter $D_K$. The piston section 19 is a working-area-volume reduction unit. The inside diameter of the jacket tube 2 is $D_M$. The following applies to the above diameters: $D_A < D_K < D_M$. Disposed between the sealing rings 8 and 12 on the one hand and the working area section 18 of the sliding tube 4 and the jacket tube 2 on the other is a working area 21 which is filled with a damping medium 20. Provided at the end of the working area section 18 that is located counter to the direction 5 is a ring 22 which is joined to the sliding tube 4. The outside diameter $D_R$ of the ring 22 is selected for a choke gap 23 to remain between the ring 22 and the inside wall 7. It is also possible to select the outside diameter $D_R$ of the ring 22 for the ring 22 to bear against the inside wall 7. This means that $D_R$ and $D_M$ are equal in size apart from a necessary clearance. In this case, the ring 22 takes the function of the working-area-volume reduction unit. In the jacket tube 2 an aperture 24 is provided in the vicinity of the working area 21, which can be closed or opened by a closing element 25. By way of a line 26, the closing element 25 is connected to a triggering unit 27 for controlled opening of the closing element 25.

The working area 21 is filled with a solid as a damping medium 20. Compressible solids of this type are known for instance from U.S. Pat. No. 3,053,526. They are commercial, for example under the brand "SILASTIC®" of DOW-Corning Corporation, U.S.A. They are being used for instance in impact shock absorbers for vehicles as known from U.S. Pat. No. 3,713,641. Compressible solids of this type are reversibly compressible i.e., their volume decreases under pressure the more the pressure grows. Upon pressure relief, they resume their original volume. On the whole, they also have corresponding flexible properties. Moreover, liquefaction of the solid occurs upon pressure increase so that the solid behaves like a fluid. However, other damping media 20 may be used as well.

The closing element 25 has a substantially solid housing 28, which is fixed to the outside 29 of the jacket tube 2 in front of the opening 24. An outlet bore 30 is provided in the housing 28; it is in alignment with the aperture 24, with one of its ends being open to ambience. A closing bore 31 is perpendicular to the bore 30, passing there-through, with one of its ends being open to ambience. In the initial position seen in FIG. 2, a cylindrical bolt 32 is disposed in the area of intersection of the bores 30, 31, closing the bore 30 outwards. As seen in FIG. 2 on the left beside the bolt 32, an ignition capsule 32 is disposed in the bore 31, which can be ignited by an electric signal from the triggering unit 27. It is also possible instead of the ignition capsule 33 to provide for instance a solenoid for displacement of the bolt 32. As regards possible alternatives in the design of the closing element 25, explicit reference is made to DE 199 59 107 A1.

The following is a description of the mode of operation of the steering column damper 1. In the initial position seen in FIG. 1, the damping medium 20 is prestressed by pressure so that the unit of the jacket tube 2 and sliding tube 4 behaves substantially like a rigid column. The ring 22 prevents the sliding tube 4 from being pushed out counter to the direction 5. The steering wheel 17 and the steering shaft 14 are normally actuated. Upon a crash of the vehicle, the electronic air bag control system releases the air bag. Depending on numerous factors such as the seriousness of the crash, passenger height and use of a seat belt, an ignition signal is emitted by the triggering unit 27 to the ignition capsule 33, causing explosion thereof. As a result of the pressure produced, the bolt 32 is shifted to the right in FIG. 2 so that the bore 30 is open to ambience. As a result of the vehicle driver crashing against the steering wheel 17 with the air bag, the sliding tube 4 is pushed into the jacket tube 2. Since the outside diameter $D_K$ of the piston section 19 exceeds the outside diameter $D_A$ of the working area section 18, the volume of the working area 21 is reduced by the retraction of the sliding tube 4 in the direction 5. The damping medium displaced escapes through the aperture 24 and the bore 30 outwards into ambience. Simultaneously, the ring 22 is moved in the direction 5, leaving a clearance behind it which is filled with the damping medium 20 from the working area 21. In this case, the damping medium 20 flows through the choke gap 23. The damping effect is generated on the one hand by the damping medium 20 being forced out through the aperture 24 and on the other hand by the damping medium 20 passing through the choke gap 23. In case the outside diameter $D_R$ of the ring 22 corresponds to the inside diameter $D_M$ of the jacket tube, the damping effect is generated solely by the damping medium being forced out through the aperture 24, there being no choke gap 23 in this case. A special advantage of the steering column damper 1 resides in that the steering shaft 14 is integrated within the damper, ensuring an especially compact design. Moreover, the entire arrangement is substantially rotationally symmetrical so that the forces that occur are distributed regularly.

Referring to FIGS. 3 to 6, the following is a description of a second embodiment of the invention. Identical components have the same reference numerals as in the first embodiment, to the description of which reference is made. Parts that differ constructionally, but are identical functionally, have the same reference numerals with an "a" suffixed. The main difference from the first embodiment resides in that two apertures 34, 35 are provided instead of one aperture 24. Two outward bores 36, 37 are disposed downstream of the apertures 34, 35 in the housing 28a. A closing bore 31a is perpendicular to these bores 36 and 37, with a bolt 32 disposed therein, closing the apertures 34 and 35. In vicinity to each bolt 32, provision is made for an ignition capsule 33, which can be ignited individually by the triggering unit 27. The aperture 34 has the same diameter as the bore 36. The aperture 35 has the same diameter as the bore 37. The diameters of the apertures 34 and 35 vary, being for instance in the ratio of 1:2. Upon impact, the triggering unit 27 may release the aperture 34. In this case, great push-in force in the direction 5 is required for the sliding tube 4 to be pushed in. If the triggering unit 27 releases the aperture 35, the necessary force is lower, because the cross-sectional area of the aperture 35 is greater than that of the aperture 34. In a third case, the triggering unit 27 may release both apertures, as a result of which an even lower push-in force is needed. Consequently, three varying damping behaviors can be set. Should the triggering unit 27 have further data of the driver available, such as height and weight, as well as further data of the accident, the triggering unit 27 can set three varying stages of damping behavior, suiting same more efficiently to the accident.

Figure 7:
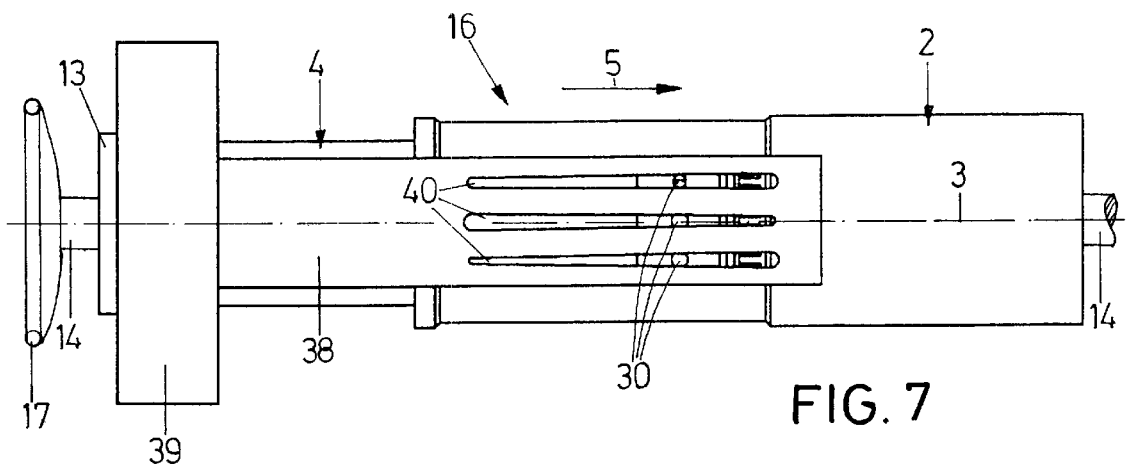
FIG. 7 is a lateral view of a steering column damper of a third embodiment.
Figure 8:
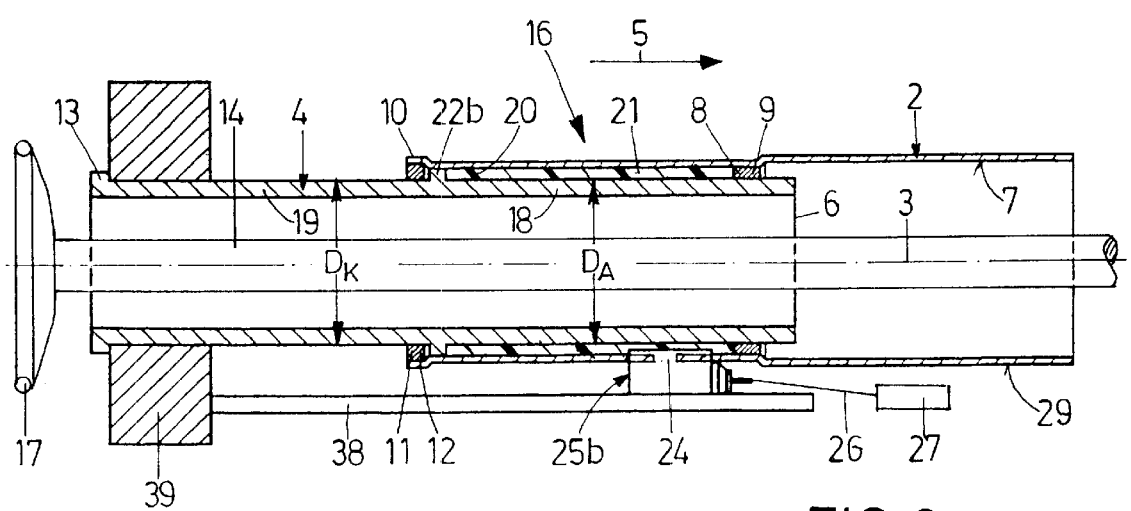
FIG. 8 is a longitudinal section through the steering column damper of FIG. 7.

A third embodiment of the invention will be described in the following, taken in conjunction with FIGS. 7 and 8. Identical parts have the same reference numerals as in the first embodiment, to the description of which reference is made. Parts that differ constructionally, but are identical functionally, have the same reference numerals with a "b" suffixed. The steering column damper 1b substantially has the same structure as the steering column damper 1. A difference resides in that the outside diameter $D_K$ of the piston section 19 and the outside diameter $D_A$ of the working area section 18 are identical. In this case, the working-area-volume reduction unit is formed by the ring 22b which is one piece with the sliding tube 4 and which bears against the inside wall 7, in this way emptying the working area 21 when the sliding tube 4 is pushed in. In the vicinity of the closing element 25b, three neighboring apertures 24 are provided in the jacket tube 2, which are lockable and releasable in the same way as illustrated in FIG. 2. A slide 38 is guided in front of the bores 30. In the vicinity of the end 13, the slide 38 is fixed by a plate 39, which is joined to the sliding tube 4, in such a way that the slide 38 is parallel to the central longitudinal axis 3. The slide 38 has three oblong holes 40 which run in the direction 5. The width of the oblong holes 40 varies over the length. The bores 30 are behind the respective oblong holes 40.

The following is a description of the mode of operation of the steering column damper 1b. Upon impact, the triggering unit 27 releases one or several apertures 24, depending on the desired damping action, so that the damping medium 20 may escape through the bores 30 and the oblong holes 40. As the sliding tube 4 is pushed in, the slide 38 is displaced in parallel thereto in the direction 5. As a result of the width of the oblong hole 40 varying over the length thereof, the cross-sectional area of discharge of the bore 30 varies and so does the associated damping characteristic over the depth of insertion of the sliding tube 4. If the width of the oblong hole 40 grows as the depth of insertion increases, the force needed for insertion decreases correspondingly and vice versa.

A fourth embodiment of the invention is described in the following, taken in conjunction with FIGS. 9 to 11. Identical parts have the same reference numerals as in the first embodiment, to the description of which reference is made. Parts that differ constructionally, but are identical functionally, have the same reference numerals with a "c" suffixed. The main difference from the first embodiment resides in the design of the working area. The outside diameter $D_K$ of the piston section 19c and the outside diameter $D_A$ of the working area section 18c are equal in dimension. The working area 21c is formed by a longitudinal crimp extending in the direction 5 in the jacket tube 2. In this area, the jacket tube 2 bulges outwards so that the working area 21c substantially has the shape of a cylinder lengthwise cut in half lengthwise. The seals 8c and 12c provided on the respective longitudinal ends of the working area 21c bear against the jacket tube 2 as well as against the sliding tube 4. Instead of the ring 22 of the first embodiment, a broach 41 is provided, which is fixed to the sliding tube 4, standing out radially there-from and bearing slidingly on the jacket tube 2 in the vicinity of the longitudinal crimp. The broach 41 is formed as a working-area-volume reduction unit. For guidance of the sliding tube 4 in the jacket tube 2, the outside diameter $D_A$ of the sliding tube 4 is such that, apart from some minor clearance, it corresponds to the inside diameter $D_M$ of the jacket tube 2 i.e., the tubes 2 and 4 are guided for displacement one within the other. In its basic structure, the closing element 25c corresponds to the closing element 25a of the first embodiment. The essential difference consists in that two apertures 34 and 35 of varying cross section adjoin the aperture 24, the cross section of the aperture 34 being smaller than the cross section of the aperture 35. The apertures 34 and 35 are each blocked by a bolt 32. In operation, at least one bolt 32 is pushed out by the triggering unit 27. As a result of the force that acts on the sliding tube 4 during a crash, the broach 41 is displaced in the working area 21c, whereby the displaced material is discharged through the aperture 24. As compared to the first embodiment, a difference resides in that the volume of the working area 21c is much smaller than the volume of the working area 21 according to the first embodiment. This means that less damping medium 20 has to be pushed out during the damping process. This implies a damping reaction of the damper 1c even with inferior forces acting on it. Consequently, the damping characteristic can be modified correspondingly by modification of the volume of the working area. As with the second embodiment, the apertures 34 and 35 may be triggered separately by the triggering unit 27. This means that only the aperture 34 or only the aperture 35 can be released or that the apertures 34 and 35 can be released jointly. In this way, three varying characteristics can be set as with the second embodiment. Of course, it is possible to block the opening 24 only by a single closing element as in the first embodiment.

In the following, a fifth embodiment of the invention is described, taken in conjunction with FIGS. 12 to 17. Identical parts have the same reference numerals as in the first embodiment, to the description of which reference is made. Parts that differ constructionally, but are identical functionally, have the same reference numerals with a "d" suffixed. FIGS. 12 to 14 illustrate the steering column damper 1d in an initial position. FIGS. 15 to 17 illustrate the steering column damper 1d in a possible position of triggering. As compared to the first embodiment, a main difference consists in the design of the closing element 25d. The ring 22 bears by its outside against the inside wall of the jacket tube 2 as described as an alternative in the first embodiment. The jacket tube 2 has several apertures 42, 43, 44 and 45 disposed one after the other in the direction 5; they open into the annular cylindrical working area 21. The apertures 42 to 45 are closed by a rocker 46 which, by its two lengthwise ends, is articulated to a cuff by means of a hinge bolt 47. Apart from where the rocker 46 is arranged, the cuff 48 is annular cylindrical along its periphery, encircling the jacket tube 2 substantially over the length of the working area 21. The cuff 48 and the jacket tube 2 are welded together. In the vicinity of the rocker 46, the cuff 48 has two radially projecting ribs 49 which face one another and in which the hinge bolts 47 are retained in associated bores. In vicinity to a rib 49, provision is made for another rib 50 on the cuff 48, holding the ignition capsule 33 in a corresponding bore so that the end of the ignition capsule adjoins one end of the hinge bolt 47. Along an axial central portion of the cuff 48, the ribs 49 are united by a shoulder 51 forming one piece therewith, with two outlets 52 being provided between the lengthwise ends of the shoulder 51 and the bolts 47. On the underside of the rocker 46, projections 53 are provided, which correspond in diameter to the apertures 42 to 45, ensuring that the associated apertures are sealed.

Upon impact, a hinge bolt 47 is shot out by the triggering unit 27. As a result of the pressure that prevails in the damping medium 20, the rocker 46 is pivoted into the condition seen in FIGS. 15 to 17. As a result, the apertures 42 to 45 are released decreasingly. This means that, given little depth of insertion of the sliding tube 4, a comparatively great quantity of damping medium 20 can be discharged through the entirely released aperture 42. As the depth of insertion increases, the remaining cross-sectional area decreases. This means that the force needed for insertion grows as the depth of insertion increases. In the alternative, with the hinge bolt 47 removed that is located at the rocker 46 end oriented in the direction 5, this means—vice versa— that the force necessary for insertion decreases as the depth of insertion grows. Consequently, the characteristic curvature can be affected correspondingly.

The following is a description of a sixth embodiment of the invention, taken in conjunction with FIGS. 18 and 19. Identical parts have the same reference numerals as in the first embodiment, to the description of which reference is made. Parts that differ constructionally, but are identical functionally, have the same reference numerals with an "e" suffixed. The jacket tube 2 has a longitudinal crimp and the sliding tube 4 a corresponding longitudinal groove, with an annular cylindrical working area housing 54 being disposed between the jacket tube 2 and the sliding tube 4 in the crimp and groove, having a bottom 55 disposed at the end located in the direction 5. By way of a flange 56 that is located at the end 13, the sliding tube 4 is connected to a piston rod 57, which runs parallel to the direction 5 and which is displaceably guided in the housing 54. A seal 58 is provided on the piston rod 57 end located in the direction 5. The working area 21e within the housing 54 is filled with the damping medium 20. The bottom 55 has an aperture 24, which is blocked by the closing element 25e. Upon impact, the triggering units 27 release the aperture 34, the aperture 35 or both. As in the case of the fourth embodiment, the two apertures differ in cross section. In this way, three varying characteristics can be set. The arrangement according to FIGS. 18 and 19 has the advantage that the damping medium 20 is disposed in a separate working area housing 54 so that the entire arrangement can be sealed especially easily.

What is claimed is:

1. A steering column damper for a power-driven vehicle comprising
    a jacket tube (2) with a central longitudinal axis (3);
    a sliding tube (4) displaceably guided in the jacket tube (2);
    a steering shaft (14), which is mounted for pivotably about the central longitudinal axis (3) relative to one of the sliding tube (4) and the jacket tube (2) and guided through the jacket tube (82) and the sliding tube (4);
    at least one working area (21; 21c, 21e), which is disposed between the jacket tube (2) and the sliding tube (4) and filled with a damping medium (20);
    at least one working-area-volume reduction unit, which is connected with the sliding tube (4), reducing the volume of the at least one working area (21; 21c; 21e) upon insertion of the sliding tube (4) into the jacket tube (2);
    at least one aperture (24; 34; 35; 42, 43, 44, 45) which opens the at least one working area (21; 21c; 21e) to ambience for discharge of the damping medium from the respective working area (21; 21c; 21e);
    a closing element (25; 25a; 25b; 25c; 25d; 25e) for blocking the at least one aperture (24; 34; 35; 42, 43, 44, 45); and
    a triggering unit (27) for controllable release of the respective closing element (25; 25a; 25b; 25c; 25d; 25e).

2. A steering column damper according to claim 1, wherein the working-area-volume reduction unit comprises a piston (19; 57), which is connected to the sliding tube (4).

3. A steering column damper according to claim 1, wherein the working area (21) is annular cylindrical.

4. A steering column damper according to claim 1, wherein the working-area-volume reduction unit comprises a bolt (41), which is connected to the sliding tube (4) and projects into the working area (21c).

5. A steering column damper according to claim 4, wherein the working area (21c) is formed in the way of a channel.

6. A steering column damper according to claim 1, wherein the working-area-volume reduction unit comprises a piston rod (57), which eccentric of the central longitudinal axis (3) and parallel thereto.

7. A steering column damper according to claim 6, wherein the working area (21e) is cylindrical.

8. A steering column damper according to claim 1, wherein two apertures (34, 35) are provided.

9. A steering column damper according to claim 8, wherein the two apertures (34, 35) have varying cross sections.

10. A steering column damper according to claim 1, wherein the closing element (25b) comprises a unit (38) for modification of the cross section of the associated aperture (24).

* * * * *